United States Patent
Shirata

(10) Patent No.: US 8,917,949 B2
(45) Date of Patent: Dec. 23, 2014

(54) IMAGE PROCESSING APPARATUS, IMAGE PROCESSING METHOD, AND RECORDING MEDIUM

(71) Applicant: Yasunobu Shirata, Tokyo (JP)

(72) Inventor: Yasunobu Shirata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 61 days.

(21) Appl. No.: 13/759,474

(22) Filed: Feb. 5, 2013

(65) Prior Publication Data
US 2013/0208994 A1   Aug. 15, 2013

(30) Foreign Application Priority Data

Feb. 13, 2012   (JP) .................................. 2012-028541

(51) Int. Cl.
*G06K 9/40*  (2006.01)
*G06T 5/00*  (2006.01)
*G06F 17/30*  (2006.01)

(52) U.S. Cl.
CPC .............. *G06T 5/006* (2013.01); *G06T 5/008* (2013.01); *G06F 17/30265* (2013.01); *G06T 2207/10024* (2013.01); *G06T 2207/20012* (2013.01); *G06T 2207/30201* (2013.01)
USPC ........................................ 382/254; 382/274

(58) Field of Classification Search
USPC .................................. 382/254, 274, 162, 166
See application file for complete search history.

(56) References Cited

U.S. PATENT DOCUMENTS

| 7,263,221 B1 * | 8/2007 | Moriwaki ...................... 382/167 |
| 2006/0008173 A1 * | 1/2006 | Matsugu et al. .............. 382/274 |
| 2009/0092297 A1 * | 4/2009 | Kitoh et al. ................... 382/128 |

FOREIGN PATENT DOCUMENTS

| JP | 4230730 | 12/2008 |
| JP | 2009-288942 | 12/2009 |

* cited by examiner

*Primary Examiner* — Yon Couso
(74) *Attorney, Agent, or Firm* — Oblon, Spivak, McClelland, Maier & Neustadt, L.L.P.

(57) ABSTRACT

An image processing apparatus comprising: an acquiring unit configured to acquire a correction target image and user information indicating characteristics of a user requesting a correction; an image accumulating unit configured to accumulate images therein; an extracting unit configured to extract an image from the image accumulating unit based on the user information acquired by the acquiring unit, the image matching the characteristics of the user requesting the correction; a setting unit configured to set a correction target value based on the image extracted by the extracting unit; and a correcting unit configured to correct the correction target image based on the correction target value.

9 Claims, 10 Drawing Sheets

| FILE NAME | SCENE | | COUNTRY | AGE |
|---|---|---|---|---|
| Img001 | PERSON | BACKLIGHT | JAPAN | 24 |
| Img002 | PERSON | NIGHT VIEW | JAPAN | 21 |
| Img003 | LANDSCAPE | BACKLIGHT | JAPAN | 33 |
| Img004 | LANDSCAPE | DIRECT LIGHT | NORTH AMERICA | 42 |
| Img005 | FOOD | DIRECT LIGHT | EUROPE | 18 |
| ⋮ | ⋮ | ⋮ | ⋮ | ⋮ |

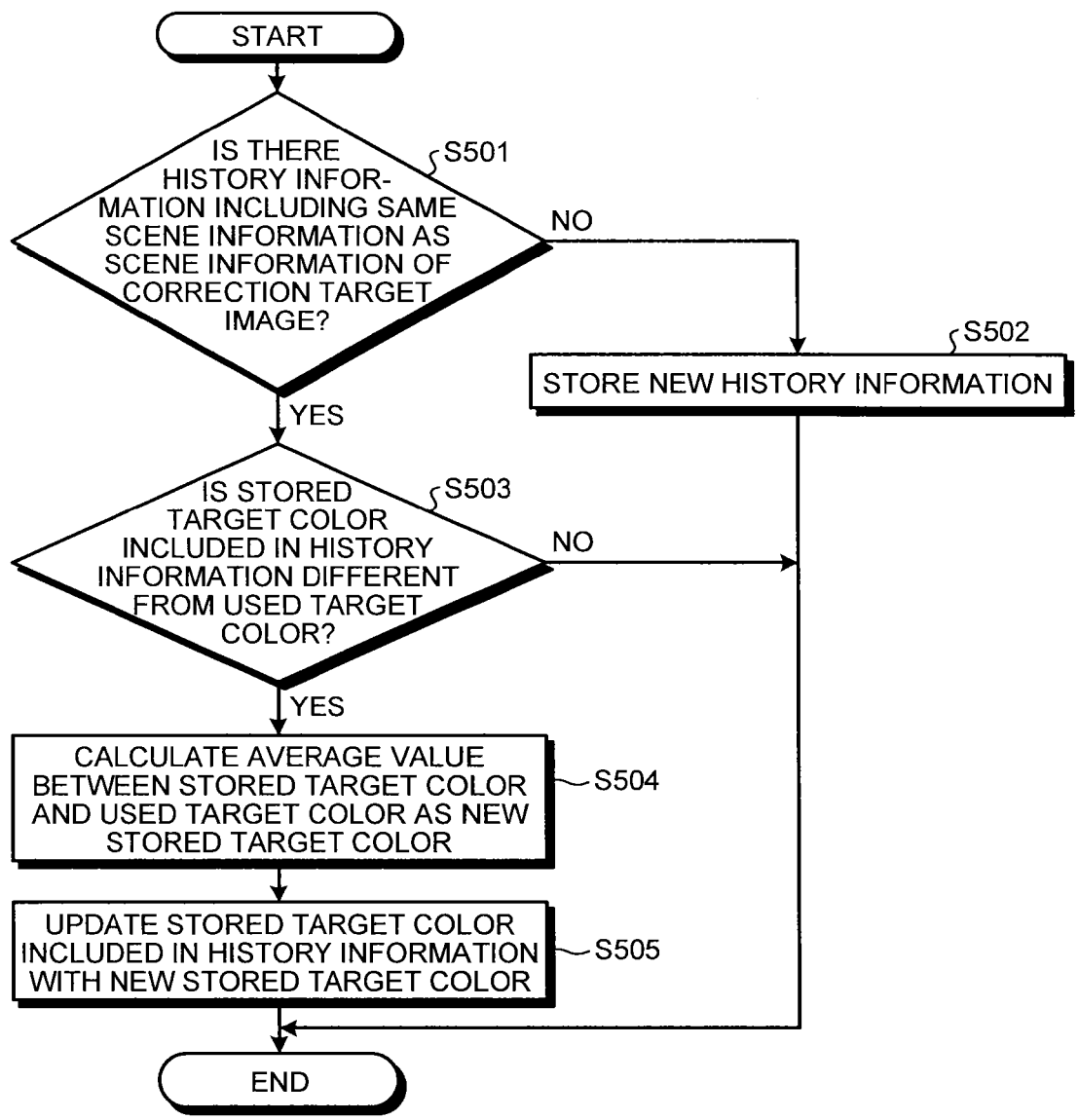

IMAGE PROCESSING APPARATUS, IMAGE PROCESSING METHOD, AND RECORDING MEDIUM

CROSS-REFERENCE TO RELATED APPLICATIONS

The present application claims priority to and incorporates by reference the entire contents of Japanese Patent Application No. 2012-028541 filed in Japan on Feb. 13, 2012.

BACKGROUND OF THE INVENTION

1. Field of the Invention

The present invention relates to an image processing apparatus, an image processing method, and a computer-readable recording medium containing a program for performing a correction process on an image.

2. Description of the Related Art

For example, an image shot by a digital camera, etc., can be processed to an image with a color shade desirable to a user, by performing an appropriate correction process on the image after shooting. As a technique for allowing the user to easily perform such a correction process on an image, for example, an image processing system described in Japanese Patent No. 4230730 is known.

In the image processing system described in Japanese Patent No. 4230730, the most similar sample image to a correction target image is selected by referring to a database where the characteristics of sample images and their respective optimal processing procedures are accumulated, and the correction target image is corrected according to a processing procedure associated with the sample image. Specifically, a similarity between a correction target image and a sample image is determined by comparing statistical data representing the characteristics of sample images accumulated in the database, with statistical data obtained from the correction target image. Then, script data representing a processing procedure associated with a sample image having the highest similarity to the correction target image is read from the database, and a correction process according to the written content of the script data is performed on the correction target image.

However, in the conventional technique described in Japanese Patent No. 4230730, since a processing procedure for a sample image that is selected based only on the similarity as an image is applied to a correction target image, there is a problem that a correction process suitable for the characteristics of a user requesting a correction, e.g., nationality and age, cannot be easily performed on the correction target image.

For example, when an image in which a person's face is photographed is attempted to be corrected, in many cases, a user desires the image to be corrected such that the color of the face gets closer to the skin color of a memory color. The memory color refers to a color shade remembered by a person as a desired color to a specific subject. Here, the memory color is not common to all people and varies depending on the characteristics (e.g., nationality and age) of a person. For example, taking skin color as an example, it is known that there is a tendency for Japanese to feel that more pinkish skin color than the actual skin color is desirable, while westerners do not like reddish skin color.

Thus, a color shade that a user feels desirable varies depending on the characteristics of the user. In the conventional technique described in Japanese Patent No. 4230730, since a correction process is performed without taking into account the characteristics of a user, a color tone obtained after correction does not always have a color shade that the user feels desirable.

For addressing the above-described problem, there is needed to provide an image processing apparatus, an image processing method, and a computer-readable recording medium containing a program that are capable of easily performing a correction process suitable for the characteristics of a user requesting a correction.

SUMMARY OF THE INVENTION

It is an object of the present invention to at least partially solve the problems in the conventional technology.

According to the present invention, there is provided an image processing apparatus comprising: an acquiring unit configured to acquire a correction target image and user information indicating characteristics of a user requesting a correction; an image accumulating unit configured to accumulate images therein; an extracting unit configured to extract an image from the image accumulating unit based on the user information acquired by the acquiring unit, the image matching the characteristics of the user requesting the correction; a setting unit configured to set a correction target value based on the image extracted by the extracting unit; and a correcting unit configured to correct the correction target image based on the correction target value.

The present invention also provides an image processing method performed by an image processing apparatus, the method comprising: acquiring, by an acquiring unit of the image processing apparatus, a correction target image and user information indicating characteristics of a user requesting a correction; accumulating, by an accumulating unit of the image processing apparatus, images; extracting, by an extracting unit of the image processing apparatus, an image from the image accumulating unit based on the user information acquired by the acquiring unit, the image matching the characteristics of the user requesting the correction; setting, by a setting unit of the image processing apparatus, a correction target value based on the image extracted by the extracting unit; and correcting, by a correcting unit of the image processing apparatus, the correction target image based on the correction target value.

The present invention also provides a non-transitory computer-readable recording medium that contains a computer program that causes a computer to execute: a function of acquiring a correction target image and user information indicating characteristics of a user requesting a correction; a function of accumulating images into an accumulating unit; a function of extracting an image from the image accumulating unit based on the acquired user information, the image matching the characteristics of the user requesting the correction; a function of setting a correction target value based on the extracted image; and a function of correcting the correction target image based on the correction target value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a diagram illustrating an example of history information;

FIG. 15 is a flowchart illustrating the flow of the process of updating a target color included in history information.

DETAILED DESCRIPTION OF THE PREFERRED EMBODIMENTS

Preferred embodiments of an image processing apparatus, an image processing method, and a program according to the present invention will be described in detail below with reference to the accompanying drawings. The embodiments described below are examples of application to a cloud computing-based image processing system that provides a correction process for a correction target image specified by a user, in the form of cloud services. Note, however, that the applicable form is not limited thereto, and the present invention can be effectively applied to systems in various forms that perform a correction process on a correction target image, or an image processing apparatus configured as a single apparatus. Note also that although in the embodiments described below an image shot by a digital camera, etc., is assumed to be a correction target image, the correction target image is not limited thereto. In addition, an image processing apparatus according to the present invention can also be implemented as, for example, one of the functions of an image forming apparatus such as a printer, a copying machine, or an MFP.

First Embodiment

Figures 1, 2:
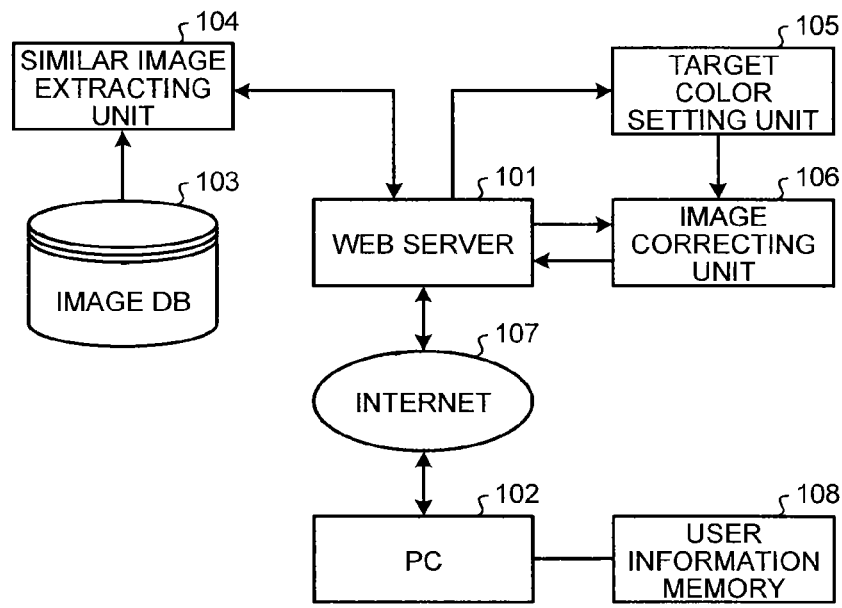
FIG. 1 is a block diagram illustrating a configuration of an image processing system of an embodiment.
FIG. 2 is an image diagram illustrating an example of index information in an image DB.

FIG. 1 is a block diagram illustrating a configuration of an image processing system of the present embodiment. The image processing system includes a web server 101; a personal computer (hereinafter, abbreviated as "PC") 102 having a web browser installed thereon; an image database (hereinafter, the database is abbreviated as "DB") 103; a similar image extracting unit 104; a target color setting unit 105; and an image correcting unit 106. The web server 101 and the PC 102 are connected to each other through a wide area network such as Internet 107. Note that the web server 101, the image DB 103, the similar image extracting unit 104, the target color setting unit 105, and the image correcting unit 106 may be configured as the functional units of a single apparatus such as a server computer, or some or all of them may be configured as independent apparatuses.

The web server 101 performs web-based information exchange with the PC 102 through the Internet 107. For example, the web server 101 acquires from the PC 102 a correction target image specified by a user, scene information indicating the subject type and shooting condition of the correction target image, and user information indicating the characteristics of the user (acquiring unit). In addition, the web server 101 presents the user with a plurality of similar images extracted by the similar image extracting unit 104 on a web screen displayed on a monitor of the PC 102, and accepts a user operation selecting one image (hereinafter, referred to as the "selected image") that the user feels desirable from among the plurality of similar images (first image presenting unit). In addition, the web server 101 presents the user with a corrected image obtained by the image correcting unit 106 performing a correction process on the correction target image, on a web screen displayed on the monitor of the PC 102, and accepts a user operation specifying whether another correction is required (second image presenting unit).

The PC 102 is a client terminal used by the user. The PC 102 has, as described above, a web browser installed thereon and performs web-based information exchange with the web server 101 through the Internet 107. The user can perform various operations such as specification of a correction target image and selection of a selected image, through web screens displayed on the monitor of the PC 102. In addition, the PC 102 includes a user information storage memory 108 that stores user information indicating the characteristics of the user, as a part of session management information associated with the web server 101. For the user information storage memory 108, for example, a storage device such as an HDD (hard disk drive) included in the body of the PC 102 may be used, or a storage device such as a memory card externally placed in the body of the PC 102 may be used.

User information stored in the user information storage memory 108 is, as described above, information indicating the characteristics of the user. The characteristics as used herein particularly refer to characteristics assumed to provide an influence on color preferences. In the present embodiment, as an example, user's nationality and age are used as user information. Note that the user information is not limited to this example, and information indicating characteristics assumed to provide an influence on color preferences can be widely used. For example, user's gender, etc., may be used as user information.

The image DB 103 accumulates multiple images obtained after performing a correction process, such that each image is associated with scene information indicating the subject type and shooting condition of the image and user information of a user requesting a correction to the image (image accumulating unit). The subject type indicated by the scene information is information indicating, for example, whether the image has a person as a subject, or whether the image has a landscape as a subject, or whether the image has a food as a subject. The shooting condition indicated by the scene information is information indicating, for example, whether the image is shot against the light, or whether the image is shot with direct light, or whether the image is one in which a night view is shot.

In the image processing system of the present embodiment, images having been subjected to a correction process by the image correcting unit 106 are stored in the image DB 103 one after another. Note, however, that there is a possibility that extraction of similar images may not be appropriately performed only by storing in the image DB 103 images having been subjected to a correction process by the image correcting unit 106, because the number of images accumulated in the image DB 103 is insufficient at the initial stage of the system introduction. Hence, in the image DB 103, images corrected in some way are stored in advance so as to be associated with scene information and user information. In this case, the scene information and the user information are inputted, for example, manually by an administrator of the system. For the scene information, when an image is stored, a scene determination may be performed by a known image recognition process, and the determination results may be automatically inputted as scene information.

FIG. 2 is an image diagram illustrating an example of index information in the image DB 103. Images accumulated in the image DB 103 are managed using index information such as that shown in FIG. 2. In the index information illustrated in FIG. 2, scene information of each image and user information (nationality and age) of a user requesting a correction to the image are described so as to be associated with a filename of the image. Image data itself is stored in the image DB 103, as an image file identified by a filename. By using the index information illustrated in FIG. 2, the images accumulated in the image DB 103 can be searched using scene information and user information as keys.

The similar image extracting unit 104 extracts from the image DB 103 similar images that match the characteristics of a user requesting a correction to a correction target image (extracting unit). Specifically, the similar image extracting unit 104 first performs a search on the image DB 103 using, as keys, scene information of a correction target image and user information which are acquired by the web server 101 from the PC 102, and performs primary extraction of images associated with user information similar to the user information acquired by the web server 101 and associated with scene information matching the scene information acquired by the web server 101, from the image DB 103. As used herein, the expression "user information is similar" means that the nationality included in the user information is identical and the error of age included in the user information falls within a predetermined range. For example, the range of ±5 years from the age included in user information acquired by the web server 101 is defined as the same age group, and when pieces of user information associated with images accumulated in the image DB 103 include the same nationality as the user information acquired by the web server 101 and include age within the range of the same age group, those pieces of user information are determined to be similar.

Then, the similar image extracting unit 104 calculates, for the images of which the primary extraction has been performed from the image DB 103, similarities, as images, to the correction target image acquired by the web server 101, i.e., the correction target image specified by the user using the PC 102. Then, the similar image extracting unit 104 selects a plurality of images whose similarities, as images, to the correction target image are greater than or equal to a predetermined reference value which is determined in advance, from among the images of which the primary extraction has been performed, and passes the plurality of images to the web server 101, as similar images. For a specific technique for calculating a similarity as an image, various known methods can be used. For example, as described in Japanese Patent No. 4230730, a similarity as an image can be calculated by dividing an image into a plurality of blocks, determining biases in hue and chroma on a block-by-block basis to create statistical data, and converting similarities of statistical data of two images into numbers using an evaluation function. For the number of images to be selected as similar images, a number that does not cause any trouble upon displaying images on a common monitor of the PC 102 may be set in advance.

Note that when there are a small number of images of which the primary extraction has been performed from the image DB 103, i.e., when primary extraction of such a number of images that is appropriate upon displaying on the monitor of the PC 102 is performed by narrowing down by user information and scene information, the images of which the primary extraction has been performed may be directly used as similar images. It is also possible to extract one similar image by a process performed by the similar image extracting unit 104. In this case, selection of a selected image by the user is not performed, and a similar image extracted by the similar image extracting unit 104 is directly passed to the target color setting unit 105, as a selected image.

The target color setting unit 105 sets a target color serving as a correction target value used when performing a correction process on the correction target image, based on a selected image which is an image selected by the user from among a plurality of similar images presented to the user by the web server 101 through a web screen on the monitor of the PC 102 (setting unit). The target color as used herein indicates a color shade targeted to reproduce a memory color such as the skin of the face or the green of plants. Note that a specific process performed by the target color setting unit 105 will be described in detail later.

The image correcting unit 106 corrects the correction target image acquired by the web server 101, based on the target color set by the target color setting unit 105 (correcting unit). For example, the image correcting unit 106 performs a correction process on the correction target image such that the color of a predetermined region included in the correction target image acquired by the web server 101 gets closer to the target color set by the target color setting unit 105. Note that a specific correction process performed by the image correcting unit 106 will be described in detail later.

Figure 3:
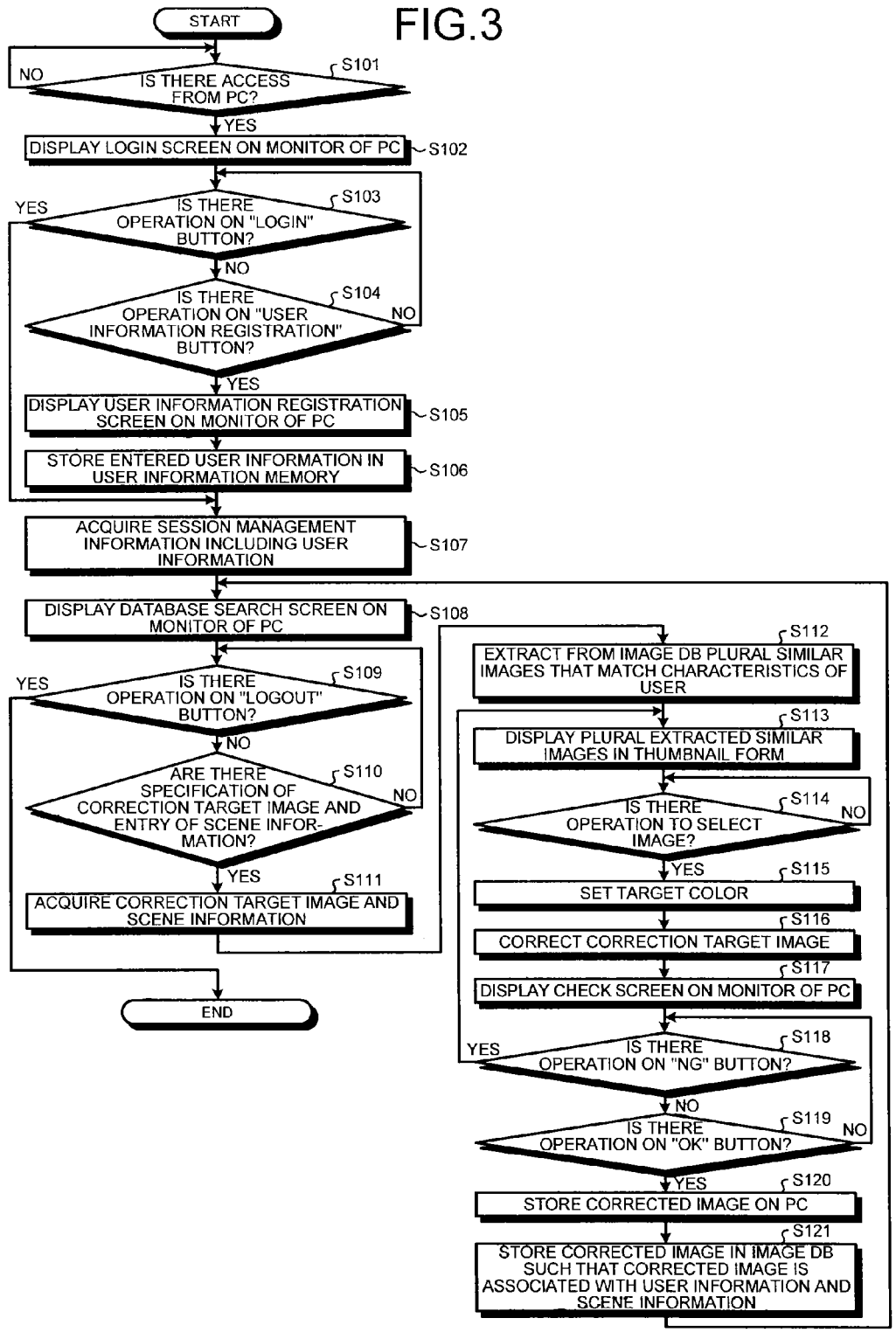
FIG. 3 is a flowchart illustrating a summary of the operation of a first embodiment of the image processing system.

Next, exemplary operation of the image processing system of the present embodiment will be described together with an operating procedure by the user. FIG. 3 is a flowchart illustrating a summary of the operation of the image processing system of the present embodiment.

Figure 4:
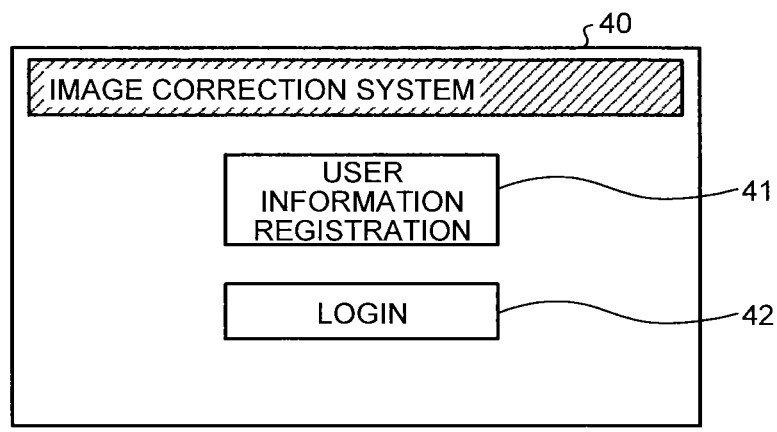
FIG. 4 is a diagram illustrating an exemplary screen of a login screen.

First, the web server 101 monitors whether there is access from the PC 102 (step S101). If there is no access from the PC 102 (step S101: No), then the web server 101 continues monitoring. On the other hand, if the user accesses the web server 101 using the PC 102, then the web server 101 detects the access from the PC 102 (step S101: Yes) and provides the PC 102 with a login screen 40 such as that shown in FIG. 4, and allows the monitor of the PC 102 to display the login screen 40 (step S102). The login screen 40 is provided with, for example, as shown in FIG. 4, a "user information registration" button 41 and a "login" button 42 which can be selected by a click operation by a pointing device, etc.

Then, the web server 101 monitors whether there is a user operation using the login screen 40 (steps S103 and S104). Here, if the user performs an operation to select the "login" button 42 (step S103: Yes), then the web server 101 detects the operation and proceeds to step S107. If the user performs an operation to select the "user information registration" button 41 (step S104: Yes), then the web server 101 detects the operation and proceeds to step S105. If there is no user operation using the login screen 40 (step S103: No and step S104: No), then the web server 101 continues monitoring a user operation.

Figure 5:
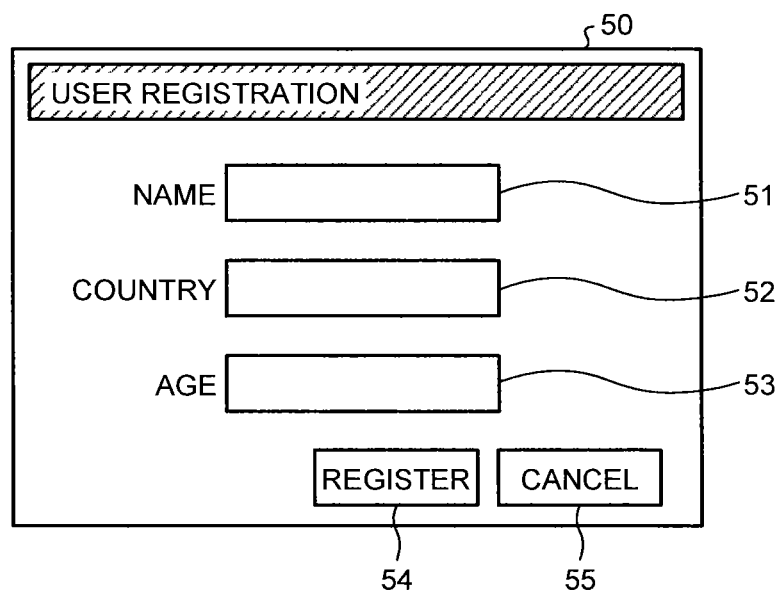
FIG. 5 is a diagram illustrating an exemplary screen of a user information registration screen.

At step S105, the web server 101 provides the PC 102 with a user information registration screen 50 such as that shown in FIG. 5, and allows the monitor of the PC 102 to display the user information registration screen 50. The user information registration screen 50 is provided with, for example, as shown in FIG. 5, a "name" entry field 51 where a user's name is entered, a "country" entry field 52 where user's nationality is entered, and an "age" entry field 53 where user's age is entered. In addition, the user information registration screen 50 is provided with a "register" button 54 and a "cancel" button 55 which can be selected by a click operation by a pointing device, etc. Here, if the user performs operations to enter a name in the "name" entry field 51, enter nationality in the "country" entry field 52, enter age in the "age" entry field 53, and select the "register" button 54, then according an instruction from the web server 101, the PC 102 stores those pieces of user information entered through the user information registration screen 50, in the user information storage memory 108 as a part of session management information like, for example, cookie such that the pieces of user information are associated with the web server 101 (step S106). Note that when the user performs an operation to select the "cancel" button 55, the entries in the "name" entry field 51, the "country" entry field 52, and the "age" entry field 53 are cleared.

At step S107, the web server 101 requests the PC 102 to acquire session management information which is stored in the user information storage memory 108 so as to be associated with the web server 101, i.e., session management information including the user information, and acquires the session management information from the PC 102. Then, the web server 101 provides the PC 102 with a database search screen 60 such as that shown in FIG. 6, and allows the monitor of the PC 102 to display the database search screen 60 (step S108).

Figure 6:
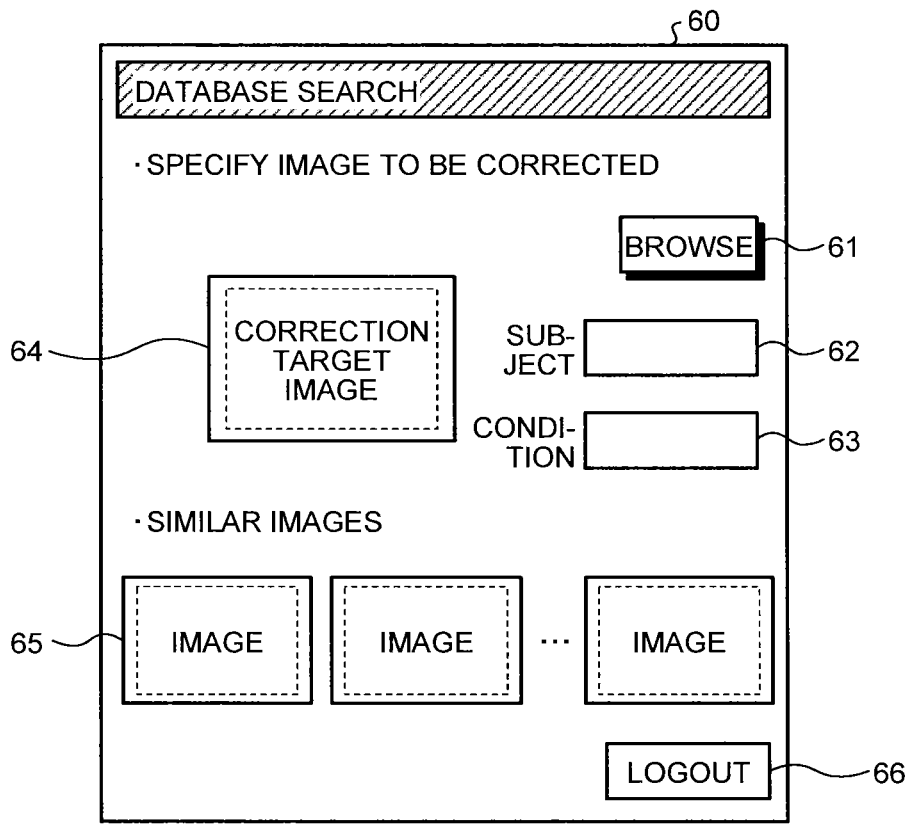
FIG. 6 is a diagram illustrating an exemplary screen of a database search screen.

The database search screen 60 is provided with, for example, as shown in FIG. 6, a "browse" button 61 which can be selected by a click operation by a pointing device, etc., a "subject" entry field 62 where a subject type which is scene information of a correction target image is entered, and a "condition" entry field 63 where a shooting condition which is scene information of the correction target image is entered. The "browse" button 61 is a button operated by the user to specify a correction target image from among images stored, for example, in the HDD included in the body of the PC 102 or a memory card placed in the body of the PC 102. In addition, the database search screen 60 is provided with a correction target image display area 64 where, when a correction target image is specified by the user, the specified correction target image is displayed in thumbnail form; and a similar image display area 65 where, when a plurality of similar images are extracted by the similar image extracting unit 104, the plurality of extracted similar images are displayed in thumbnail form. In addition, the database search screen 60 is provided with a "logout" button 66 which can be selected by a click operation by a pointing device, etc.

Here, if the user selects the "browse" button 61 by a click operation by a pointing device of the PC 102, etc., then, for example, a list showing the storage locations of images managed by the PC 102 and the filenames of the images is displayed in pop-up screen form so as to be superimposed on the database search screen 60. Then, an image selected by the user from the list is specified as a correction target image. The correction target image specified by the user is displayed in thumbnail form in the correction target image display area 64 of the database search screen 60. A subject type and a shooting condition which serve as scene information of the specified correction target image can be entered through the "subject" entry field 62 and the "condition" entry field 63 of the database search screen 60. Note that although in the present embodiment the user enters the scene information of the correction target image, it is also possible that the PC 102 performs a scene determination by a known image recognition process on the specified correction target image, or when extracting similar images, the similar image extracting unit 104 performs a scene determination on the correction target image by a known image recognition process, and the determination results are used as the scene information of the correction target image. In this case, there is no need to provide the "subject" entry field 62 and the "condition" entry field 63 on the database search screen 60.

The web server 101 monitors whether there is a user operation using the database search screen 60 (steps S109 and S110). Here, if the user performs an operation to select the "logout" button 66 (step S109: Yes), then the series of processes illustrated in FIG. 3 end. If the user performs, as described above, operations to specify a correction target image and enter scene information of the correction target image (step S110: Yes), then processing proceeds to step S111. If there is no user operation using the database search screen 60 (step S109: No and step S110: No), then the web server 101 continues monitoring a user operation.

At step S111, the web server 101 acquires from the PC 102 the correction target image and scene information specified by the user on the database search screen 60. Then, the web server 101 passes the user information included in the session management information acquired at step S107 and the correction target image and scene information acquired at step S111 to the similar image extracting unit 104, and requests the similar image extracting unit 104 to extract similar images.

In response to the request from the web server 101, the similar image extracting unit 104 extracts from the image DB 103 a plurality of similar images that match the characteristics of the user, and returns the plurality of extracted similar images to the web server 101 (step S112). Specifically, the similar image extracting unit 104 first performs a search on the image DB 103 using, as keys, the scene information of the correction target image and the user information, and performs primary extraction of images associated with user information similar to the user information acquired by the web server 101 and associated with scene information matching the scene information acquired by the web server 101, from the image DB 103. Then, the similar image extracting unit 104 calculates, for the images of which the primary extraction has been performed from the image DB 103, similarities, as images, to the correction target image and returns, as similar images, the top N images (N is a predetermined number which is determined in advance) whose similarities are greater than or equal to a predetermined reference value which is determined in advance, to the web server 101.

When the web server 101 receives the N similar images from the similar image extracting unit 104, the web server 101 displays the N similar images in thumbnail form in the similar image display area 65 of the database search screen 60 displayed on the monitor of the PC 102 (step S113). Then, the web server 101 monitors whether there is a user operation selecting any of the N similar images displayed in thumbnail form in the similar image display area 65 of the database search screen 60 (step S114). While a user operation is not detected (step S114: No), the web server 101 continues monitoring. If a user operation selecting any of the similar images has been detected (step S114: Yes), then the web server 101 passes the selected image which is the similar image selected by the user to the target color setting unit 105, and requests the target color setting unit 105 to set a target color. Note that in the similar image display area 65, selection of a similar image displayed in thumbnail form can be performed by a click operation by a pointing device, etc.

In response to the request from the web server 101, the target color setting unit 105 sets a target color which serves as a correction target value used when making a correction to the correction target image, based on the selected image passed from the web server 101 (step S115). When the target color is set by the target color setting unit 105, the web server 101 then passes the correction target image acquired at step S111 to the image correcting unit 106, and requests the image correcting unit 106 to correct the correction target image.

In response to the request from the web server 101, the image correcting unit 106 performs a correction process on the correction target image based on the target color set by the target color setting unit 105, and returns the corrected image to the web server 101 (step S116).

Figure 7:
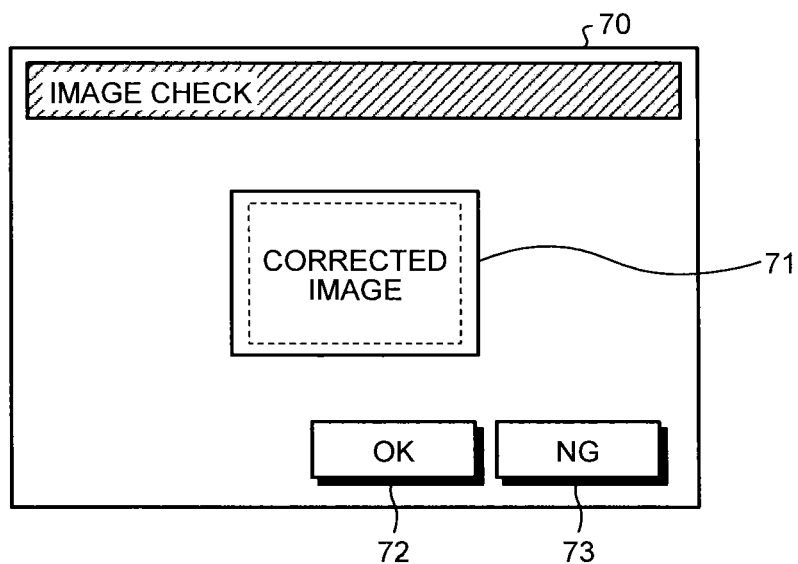
FIG. 7 is a diagram illustrating an exemplary screen of an image check screen.

When the web server 101 receives the corrected image from the image correcting unit 106, the web server 101 provides the PC 102 with an image check screen 70 such as that shown in FIG. 7, and allows the monitor of the PC 102 to display the image check screen 70 (step S117). The image check screen 70 is provided with, for example, as shown in FIG. 7, a corrected image display region 71 where a corrected image is displayed in thumbnail form. In addition, the image check screen 70 is provided with an "OK" button 72 and an "NG" button 73 which can be selected by a click operation by a pointing device, etc. The user can provide an instruction as to whether another correction is required, by checking the corrected image displayed in thumbnail form in the corrected image display region 71 of the image check screen 70 and selecting the "OK" button 72 or the "NG" button 73.

Then, the web server 101 monitors a user operation using the image check screen 70 (steps S118 and S119). Here, if the user performs an operation to select the "NG" button 73 (step S118: Yes), then processing returns to step S113 and a database search screen 60 having similar images displayed in thumbnail form in a similar image display area 65 is displayed on the monitor of the PC 102, and selection of another similar image by the user is waited for. On the other hand, if the user performs an operation to select the "OK" button 72 (step S119: Yes), then processing proceeds to step S120. If there is no user operation using the image check screen 70 (step S118: No and step S119: No), then the web server 101 continues monitoring a user operation.

At step S120, the web server 101 provides the PC 102 with the corrected image received from the image correcting unit 106, and allows the HDD included in the body of the PC 102, a memory card placed in the body of the PC 102, or the like, to store the corrected image. At this time, the web server 101 may also provide the PC 102 with information on the target color used when the image correcting unit 106 corrects the correction target image, and allow the user information storage memory 108 to store, as history information, the target color used when correcting the correction target image and the scene information of the correction target image together such that the target color and the scene information are associated with the user information (registering unit).

Then, the web server 101 stores the corrected image received from the image correcting unit 106 in the image DB 103 such that the image is associated with the scene information of the correction target image and the user information (step S121). Thereafter, the web server 101 returns to step S108 and allows the monitor of the PC 102 to display again a database search screen 60 in an initial state. If the user specifies another correction target image using the database search screen 60, then subsequent processes are repeated. On the other hand, if the user selects a "logout" button 66 on the database search screen 60, then the series of processes illustrated in FIG. 3 end.

Next, specific examples of processes performed by the target color setting unit 105 and the image correcting unit 106 will be described. Note that in the following, description is made assuming the case in which a correction target image and a selected image are images each having a person as a subject, and a correction is made to bring the skin color of a person's face closer to a memory color. Note, however, that in the case of making a correction to bring the blue of the blue sky, the green of trees or grass, or the like, included in an image closer to a memory color, too, the same process as that shown below can be applied only by changing a predetermined region serving as a memory color reproduction target to be detected from the image. Note also that in the following description the color information of an image is basically composed of RGB data, and each processor performs a process by appropriately converting, if needed, an RGB value to a CIE $L^*a^*b^*$ value or an $L^*C^*H^*$ value (a value obtained by converting coordinates ($a^*$, $b^*$) in the $a^*b^*$ plane in the CIE $L^*a^*b^*$ color system to polar coordinate representation ($C^*$, $H^*$)). In addition, the color space of an image is, for example, sRGB color space which is commonly used on the Internet 107.

Figure 8:
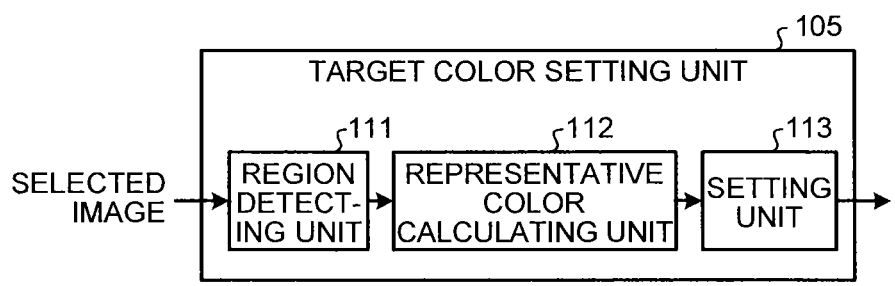
FIG. 8 is a block diagram illustrating an exemplary configuration of a target color setting unit.

FIG. 8 is a block diagram illustrating an exemplary configuration of the target color setting unit 105. The target color setting unit 105 includes, as shown in FIG. 8, a region detecting unit 111, a representative color calculating unit 112, and a setting unit 113.

The region detecting unit 111 receives from the web server 101 a selected image which is selected by the user from among a plurality of similar images, and detects a predetermined region serving as a memory color reproduction target, from the selected image. Here, the region detecting unit 111 detects a face region which is a region where a person's face is photographed in the selected image. Various techniques for detecting a face region from an image are proposed, and thus, the region detecting unit 111 detects a face region from the selected image using the known techniques. Note that the predetermined region serving as a memory color reproduction target is not limited to a face region; for example, the predetermined region may be a region of the blue of the blue sky or a region of the green of trees or grass. Those predetermined regions can be determined, for example, by specification by the user. Alternatively, a predetermined region may be determined based on scene information of a selected image, etc.

The representative color calculating unit 112 calculates a representative color of the face region detected from the selected image by the region detecting unit 111. The representative color is an index indicating the color shade of the entire region. The representative color calculating unit 112 can calculate, as a representative color, for example, an average RGB value obtained by averaging the RGB values of the respective pixels included in the face region detected by the region detecting unit 111.

The setting unit 113 sets a target color for reproducing a memory color in the face region of the correction target image, based on the representative color of the face region calculated by the representative color calculating unit 112. Here, the setting unit 113 sets the representative color calculated by the representative color calculating unit 112, as a target color as it is. Note, however, that the setting unit 113 may set, as a target color, a color obtained by making a correction according to a shooting condition of the selected image, etc., to the representative color calculated by the representative color calculating unit 112.

Figure 9:
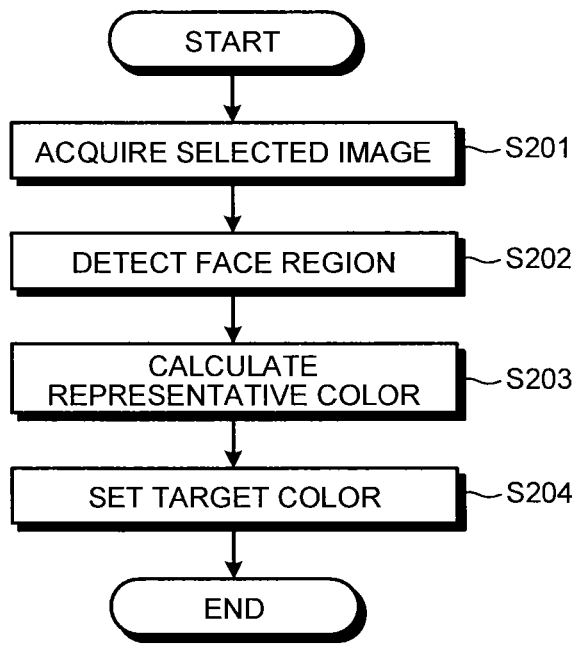
FIG. 9 is a flowchart illustrating the flow of a process performed by the target color setting unit.

FIG. 9 is a flowchart illustrating the flow of a process performed by the target color setting unit 105. The target color setting unit 105 first acquires, at step S201, a selected image from the web server 101. Then, at step S202, the region detecting unit 111 detects a face region from the selected image acquired at step S201. Then, at step S203, the representative color calculating unit 112 calculates an average RGB value of the face region detected at step S202, as a representative color of the face region of the selected image. Finally, at step S204, the setting unit 113 sets the representative color calculated at step S203, as a target color (Dest_R, Dest_G, Dest_B) serving as a memory color reproduction target for a correction target image.

Figure 10:
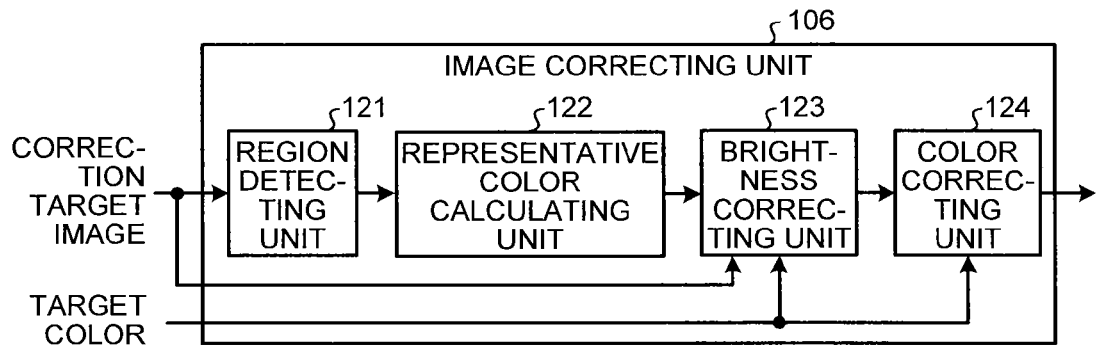
FIG. 10 is a block diagram illustrating an exemplary configuration of an image correcting unit.

FIG. 10 is a block diagram illustrating an exemplary configuration of the image correcting unit 106. The image correcting unit 106 includes, as shown in FIG. 10, a region detecting unit 121, a representative color calculating unit 122, a brightness correcting unit 123, and a color correcting unit 124.

The region detecting unit 121 receives a correction target image specified by the user from the web server 101, and detects a predetermined region (a face region in the present embodiment) serving as a memory color reproduction target, from the correction target image.

The representative color calculating unit 122 calculates a representative color of the face region detected from the correction target image by the region detecting unit 121. The representative color is, for example, an average RGB value obtained by averaging the RGB values of the respective pixels included in the face region detected by the region detecting unit 121.

The brightness correcting unit 123 makes a brightness correction to the correction target image, based on the representative color calculated by the representative color calculating unit 122 and the target color set by the target color setting unit 105.

The color correcting unit 124 makes a color correction to the correction target image having been subjected to the brightness correction by the brightness correcting unit 123, based on the representative color calculated by the representative color calculating unit 122 and the target color set by the target color setting unit 105.

Figure 11:
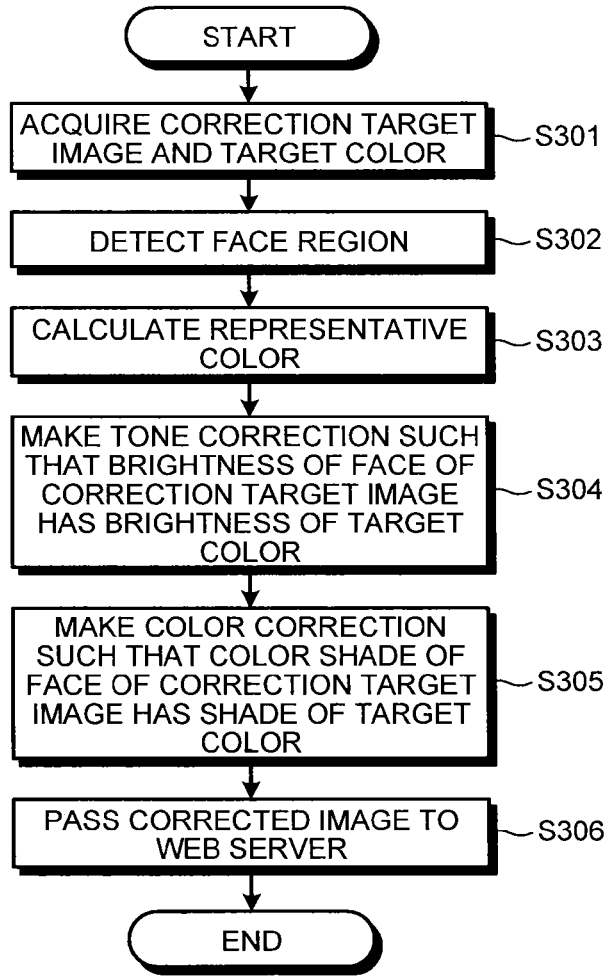
FIG. 11 is a flowchart illustrating the flow of a process performed by the image correcting unit.

FIG. 11 is a flowchart illustrating the flow of a process performed by the image correcting unit 106. The image correcting unit 106 first acquires, at step S301, a correction target image from the web server 101 and a target color (Dest_R, Dest_G, Dest_B) from the target color setting unit 105. Then, at step S302, the region detecting unit 121 detects a face region from the correction target image acquired at step S301. Then, at step S303, the representative color calculating unit 122 calculates an average RGB value of the face region detected at step S302, as a representative color (Face_R, Face_G, Face_B) of the face region of the correction target image.

Then, at step S304, the brightness correcting unit 123 makes a tone correction such that the brightness of the representative color (Face_R, Face_G, Face_B) calculated at step S303 has the brightness of the target color (Dest_R, Dest_G, Dest_B). For the tone correction, for example, a brightness correction table is set where luminance (Face_Y) obtained from the representative color (Face_R, Face_G, Face_B) of the face region of the correction target image has luminance (Dest_Y) of the target color (Dest_R, Dest_G, Dest_B). Then, a luminance value is converted according to the brightness correction table, by which a brightness correction is made.

Figure 12:
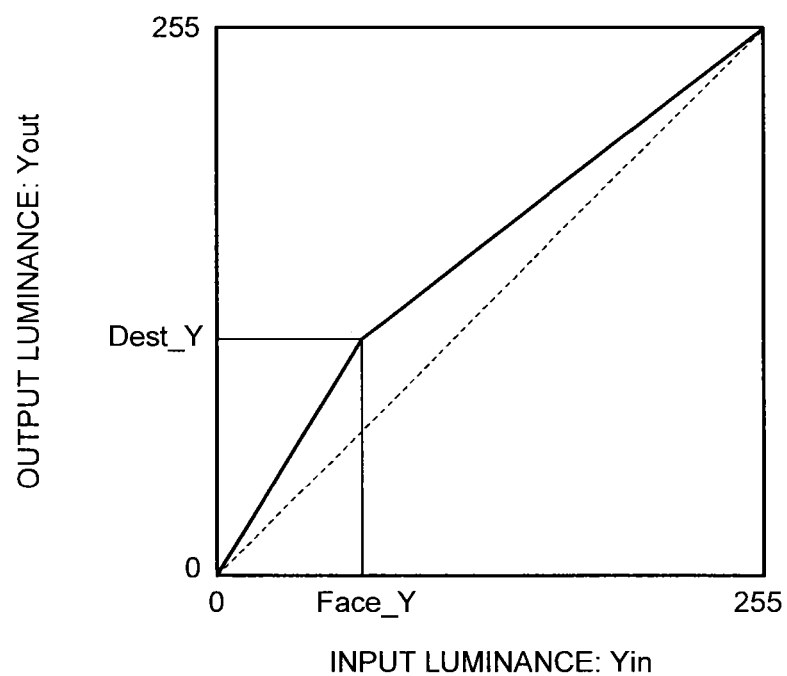
FIG. 12 is a diagram illustrating an example of a brightness correction table.

For example, it is assumed that a brightness correction table such as that illustrated in FIG. 12 is set. With the luminance value obtained after conversion according to the brightness correction table being Yout and the input luminance value being Yin, conversion from an input RGB value (assumed to be (Rin, Gin, Bin)) to an output RGB value (assumed to be (Rout, Gout, Bout)) is performed according to the following equation (1):

$$Rout=(Yout/Yin) \times Rin$$

$$Gout=(Yout/Yin) \times Gin$$

$$Bout=(Yout/Yin) \times Bin \qquad (1)$$

Y in the above-described equation (1) is the luminance value obtained from an RGB value by a conversion equation in the following equation (2):

$$Y=0.299 \times R+0.587 \times G+0.114 \times B \qquad (2)$$

In the above-described manner, a brightness correction process based on the brightness correction table is performed. Note that although in the present embodiment a correction example is shown in which only the brightness of the face region is targeted, a technique of a known brightness correction method in which a correction table is modified so as to prevent the occurrence of a tone jump in highlight regions other than the face may be used together.

Then, at step S305, the color correcting unit 124 performs a color correction process in which the color shade of the face region having been subjected to the brightness correction at step S304 is converted to the shade of the target color. For example, the color correcting unit 124 performs a color correction process using linear masking. In the color correction process by linear masking, a hue border including the face region is specified and a color correction process is performed only on the specified hue.

In this case, the color correcting unit 124 sets coefficients for making a color correction such that the representative color (Face_R', Face_G', Face_B') of the face region of the correction target image having been subjected to the brightness correction at step S304 has the shade of the target color (Dest_R, Dest_G, Dest_B). Specifically, when a white dot is (w_R, w_G, w_B), a black dot is (k_R, k_G, k_B), and two points representing the hue border of the face region are (border_R1, border_G1, border_B1) and (border_R2, border_G2, border_B2), masking coefficients X11, X12, X13, X14, X21, X22, X23, X24, X31, X32, X33, X34, X41, X42, X43, X44, X51, X52, X53, X54, X61, X62, X63, X64, X71, X72, X73, X74, X81, X82, X83, and X84 that satisfy matrix operations in the following equations (3) and (4) are determined by, for example, computing an inverse matrix.

$$\begin{bmatrix} w\_R & k\_R & Dest\_R & border\_R1 \\ w\_G & k\_G & Dest\_G & border\_G1 \\ w\_B & k\_B & Dest\_B & border\_B1 \\ 1 & 1 & 1 & 1 \end{bmatrix} = \qquad (3)$$

$$\begin{bmatrix} X11 & X12 & X13 & X14 \\ X21 & X22 & X23 & X24 \\ X31 & X32 & X33 & X34 \\ X41 & X42 & X43 & X44 \end{bmatrix} \times \begin{bmatrix} w\_R & k\_R & Face\_R' & border\_R1 \\ w\_G & k\_G & Face\_G' & border\_G1 \\ w\_B & k\_B & Face\_B' & border\_B1 \\ 1 & 1 & 1 & 1 \end{bmatrix}$$

$$\begin{bmatrix} w\_R & k\_R & Dest\_R & border\_R2 \\ w\_G & k\_G & Dest\_G & border\_G2 \\ w\_B & k\_B & Dest\_B & border\_B2 \\ 1 & 1 & 1 & 1 \end{bmatrix} = \tag{4}$$

$$\begin{bmatrix} X51 & X52 & X53 & X54 \\ X61 & X62 & X63 & X64 \\ X71 & X72 & X73 & X74 \\ X81 & X82 & X83 & X84 \end{bmatrix} \times \begin{bmatrix} w\_R & k\_R & Face\_R' & border\_R2 \\ w\_G & k\_G & Face\_G' & border\_G2 \\ w\_B & k\_B & Face\_B' & border\_B2 \\ 1 & 1 & 1 & 1 \end{bmatrix}$$

In addition, the color correcting unit 124 selects one of the above-described equations (3) and (4) that is used in a color correction process, according to the hue value of the RGB value (d_R, d_G, d_B) of the correction target image obtained after the brightness correction. Specifically, when an LCH converted value obtained by performing LCH conversion on two points representing the hue border (border_R1, border_G1, border_B1) and (border_R2, border_G2, border_B2) are (border_L1, border_C1, border_H1) and (border_L2, border_C2, border_H2), the LCH converted value of the RGB value (d_R, d_G, d_B) of the correction target image obtained after the brightness correction is (d_L, d_C, d_H), and the LCH converted value of the target color (Dest_R, Dest_G, Dest_B) is (Dest_L, Dest_C, Dest_H), if the following condition (A) is satisfied, then masking coefficients determined by the above-described equation (3) are selected, and if the following condition (B) is satisfied, then masking coefficients determined by the above-described equation (4) are selected, and if the following condition (C) is satisfied, then a color correction is not made.

$\text{border}\_H1 < d\_H \le \text{Dest}\_H$      Condition (A):

$\text{Dest}\_H < d\_H < \text{border}\_H2$      Condition (B):

$d\_H \le \text{border}\_H1 \text{ or } d\_H \ge \text{border}\_H2$      Condition (C):

In the above-described manner, the color correcting unit 124 selects masking coefficients appropriate for the hue of the RGB value (d_R, d_G, d_B) of the correction target image obtained after the brightness correction. Note that two points representing the hue border of the face region may be predetermined constants, or may be adaptively determined, e.g., a maximum hue value and a minimum hue value are set as a hue border, based on the result of detection of a face region.

Then, the color correcting unit 124 makes a color correction to the RGB value (d_R, d_G, d_B) of the correction target image obtained after the color correction, based on a matrix operation expression in the following equation (5), and thereby determines an output pixel value (d_R', d_G', d_B'). By this, a correction is made to bring the color shade of the face region of the correction target image closer to the shade of the target color.

$$\begin{bmatrix} d\_R' \\ d\_G' \\ d\_B' \\ 1 \end{bmatrix} = \begin{bmatrix} X1 & X2 & X3 & X4 \\ X5 & X6 & X7 & X8 \\ X9 & X10 & X11 & X12 \\ X13 & X14 & X15 & X16 \end{bmatrix} \times \begin{bmatrix} d\_R \\ d\_G \\ d\_B \\ 1 \end{bmatrix} \tag{5}$$

Note that the masking coefficients X1 to X16 in the above-described equation (5) correspond to the masking coefficients X11 to X44 in the above-described equation (3) or the masking coefficients X51 to X84 in the above-described equation (4).

When the above-described color correction process by the color correcting unit 124 has been completed, the image correcting unit 106 finally passes, at step S306, the corrected image to the web server 101 and ends the process.

As described in detail above using a specific example, in the image processing system of the present embodiment, the web server 101 acquires user information indicating the characteristics (nationality, age, etc.) of a user requesting for a correction. Based on the user information, the similar image extracting unit 104 extracts from the image DB 103 similar images that match the characteristics of the user. Then, based on a selected image selected by the user from among the extracted similar images, the target color setting unit 105 sets a target color. Based on the set target color, the image correcting unit 106 corrects a correction target image. Therefore, according to the image processing system of the present embodiment, a correction process suitable for the characteristics of a user requesting a correction can be easily performed.

In addition, in the image processing system of the present embodiment, the similar image extracting unit 104 extracts similar images from the image DB 103, using not only user information but also scene information indicating the subject type and shooting condition of an image. Thus, similar images that match the characteristics of a user and that are similar to a correction target image can be efficiently narrowed down.

In addition, in the image processing system of the present embodiment, the similar image extracting unit 104 extracts, as similar images, images whose similarities, as images, to a correction target image are greater than or equal to a reference value among images of which primary extraction has been performed from the image DB 103. Thus, similar images that match the characteristics of a user and that are similar to the correction target image can be accurately extracted.

In addition, in the image processing system of the present embodiment, the web server 101 presents the user with a plurality of similar images extracted by the similar image extracting unit 104, on a database search screen 60. Then, based on a selected image selected by the user from among the plurality of similar images, the target color setting unit 105 sets a target color. Thus, a correction process for a correction target image according to user preferences can be more effectively performed.

Second Embodiment

Next, an image processing system of a second embodiment will be described. In the present embodiment, a web server 101 stores, in a user information storage memory 108, a target color used in a correction process for a correction target image together with scene information of the correction target image, as history information such that the target color and the scene information are associated with user information (registering unit). In addition, if, when a correction target image is specified by a user, there is history information including scene information that matches scene information of the correction target image, then a target color setting unit 105 first sets a target color included in the history information, as a target color used to correct the correction target image. In the following, the same or corresponding components as/to those of the first embodiment are denoted by the same reference numerals, and a description that overlaps with that of the first embodiment is appropriately omitted, and characteristic processes of the image processing system of the present embodiment will be mainly described.

Figure 13:
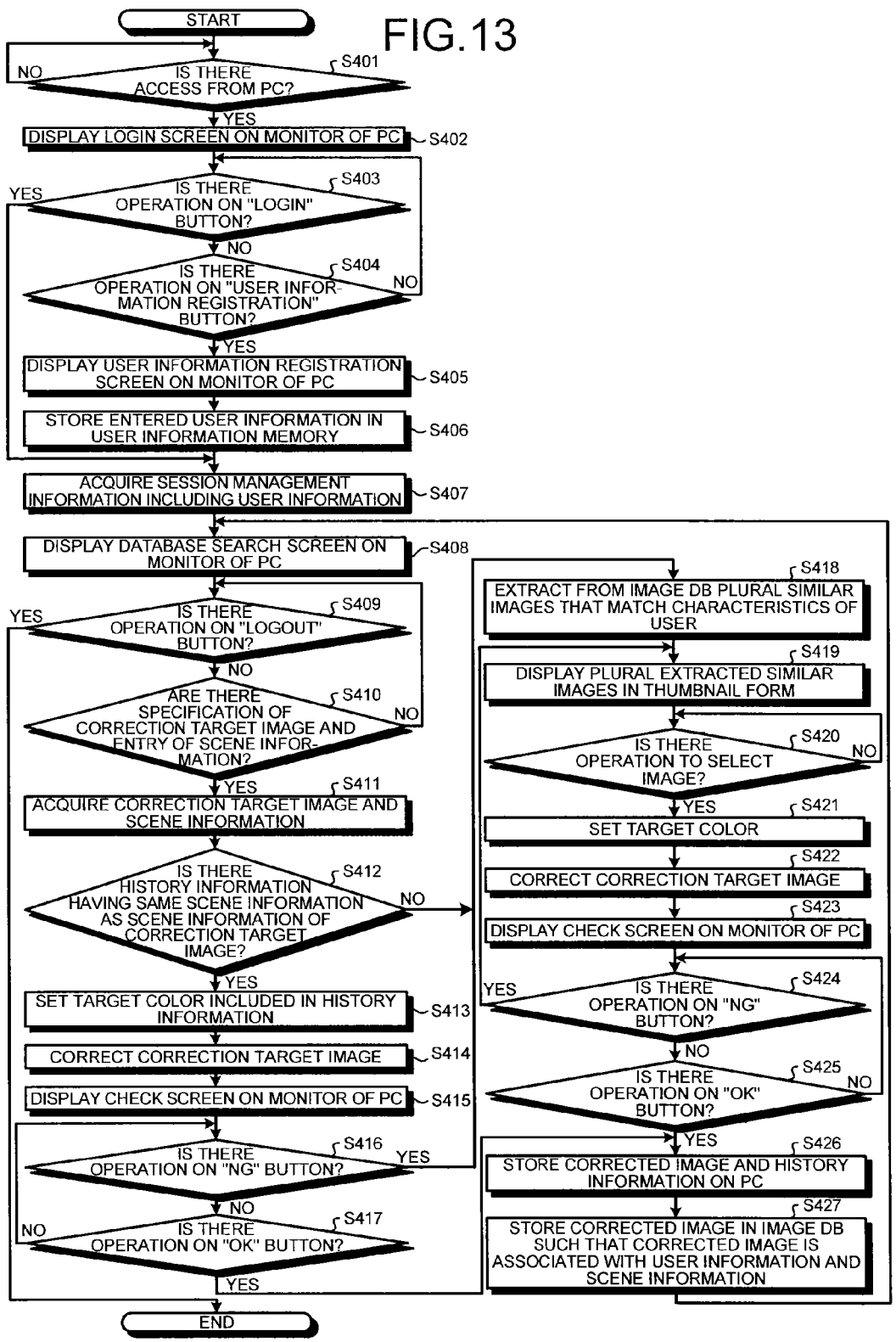
FIG. 13 is a flowchart illustrating a summary of the operation of a second embodiment of the image processing system.

FIG. 13 is a flowchart illustrating a summary of the operation of the image processing system of the present embodiment. The processes at steps S401 to S411 of FIG. 13 are similar to those at steps S101 to S111 of FIG. 3 illustrated as the first embodiment. Note, however, that in the present embodiment, session management information acquired by the web server 101 from a PC 102 at step S407 includes history information in addition to user information. The history information is information about a correction process requested by the user in the past. As illustrated in FIG. 14, the history information is such that a target color applied in a past correction process is recorded with scene information of a correction target image used at that time. The history information is stored in the user information storage memory 108 as a part of session information, so as to be associated with user information.

In the present embodiment, after the web server 101 acquires, at step S411, from the PC 102 a correction target image and scene information which are specified by the user, the web server 101 determines whether the session management information acquired at step S407 has history information including the same scene information as the scene information acquired at step S411 (step S412). Here, if there is no history information including the same scene information as the scene information acquired at step S411 (step S412: No), then processing proceeds to step S418.

On the other hand, if there is history information including the same scene information as the scene information acquired at step S411 (step S412: Yes), then the web server 101 passes a target color included in the history information to the target color setting unit 105, and requests the target color setting unit 105 to set the target color. In response to the request from the web server 101, the target color setting unit 105 sets the correction color included in the history information, as a target color used when making a correction to the correction target image (step S413). When the target color is set by the target color setting unit 105, the web server 101 then passes the correction target image acquired at step S411 to an image correcting unit 106, and requests the image correcting unit 106 to correct the correction target image. In response to the request from the web server 101, the image correcting unit 106 performs a correction process on the correction target image based on the target color set by the target color setting unit 105, and returns the corrected image to the web server 101 (step S414).

When the web server 101 receives the corrected image from the image correcting unit 106, the web server 101 allows a monitor of the PC 102 to display an image check screen 70 illustrated in FIG. 7 (step S415). In a corrected image display region 71 of the image check screen 70, the image corrected at step S414, i.e., the image corrected based on the target color included in the history information of the user, is displayed in thumbnail form. The user checks the corrected image displayed in thumbnail form in the corrected image display region 71 of the image check screen 70, and selects an "OK" button 72 or an "NG" button 73, and can thereby provide an instruction as to whether another correction is required.

Then, the web server 101 monitors a user operation using the image check screen 70 (steps S416 and S417). Here, if the user performs an operation to select the "NG" button 73 (step S416: Yes), then processing proceeds to step S418. On the other hand, if the user performs an operation to select the "OK" button 72 (step S417: Yes), then processing proceeds to step S426. If there is no user operation using the image check screen 70 (step S416: No and step S417: No), then the web server 101 continues monitoring a user operation.

The processes at steps S418 to S427 of FIG. 13 are similar to those at steps S112 to S121 of FIG. 3 illustrated as the first embodiment. Specifically, in the present embodiment, when the user having checked, on the image check screen 70, the corrected image which is corrected based on the target color included in the history information performs an operation to select the "NG" button 73 on the image check screen 70 (step S416: Yes), or when there is no history information including the same scene information as the scene information of the correction target image (step S412: No), as in the first embodiment, a target color is set from a similar image which is extracted from an image DB 103 based on the user information, and then a correction to the correction target image is made.

Note, however, that in the present embodiment, when, at step S426, the web server 101 provides the PC 102 with the corrected image and allows an HDD, a memory card, or the like, to store therein the corrected image, the web server 101 also provides the PC 102 with information on the target color used when the image correcting unit 106 corrects the correction target image, and allows the user information storage memory 108 to store therein the target color used when correcting the correction target image and the scene information of the correction target image together as history information such that the target color and the scene information are associated with the user information. At this time, when there is history information including the same scene information as the scene information of the correction target image, and a target color included in the history information is different from the target color used when correcting the correction target image, the target color included in the history information is updated with the new target color.

As described above, in the image processing system of the present embodiment, if there is history information including the same scene information as the scene information of a correction target image, then a correction to the correction target image is made using a target color included in the history information. When the user provides an instruction to make another correction to the corrected image, or when there is no history information including the same scene information as the scene information of the correction target image, a target color is set from a similar image which is extracted from the image DB 103 based on user information, and then a correction to the correction target image is made. Therefore, according to the image processing system of the present embodiment, a correction process for a correction target image is efficiently performed, enabling to reduce the processing load and the burden on the user operation.

Third Embodiment

Next, an image processing system of a third embodiment will be described. The present embodiment is a variant of the second embodiment, and is different from the second embodiment in the process of updating a target color included in history information. Other processes and the configuration of the image processing system are the same as those of the second embodiment, and thus, only the process of updating a target color included in history information which is a characteristic process in the present embodiment will be described below.

In the image processing system of the present embodiment, as in the second embodiment, after a correction process for a correction target image has been completed, a target color used in the correction process, together with scene information of the correction target image is stored in a user information storage memory 108, as history information. At this time, when there is history information including the same scene information as the scene information of the correction target image, and a target color included in the history information (hereinafter, referred to as a "stored target color") is different from the target color used when correcting the correction target image (hereinafter, referred to as a "used target color"), in the present embodiment, an average value between the stored target color and the used target color is calculated as a new stored target color, and the stored target color included in the history information is updated with the new stored target color.

FIG. 15 is a flowchart illustrating the flow of the process of updating a target color included in history information, which is performed by the image processing system of the present embodiment. In the image processing system of the present embodiment, after a correction to a correction target image has been completed, a web server 101 performs a process illustrated in the flowchart of FIG. 15.

The web server 101 first determines, at step S501, whether there is history information including the same scene information as the scene information of the correction target image. If there is no history information including the same scene information as the scene information of the correction target image (step S501: No), then at step S502 the web server 101 allows the user information storage memory 108 of a PC 102 to store therein, as new history information, a used target color used to correct the correction target image, together with the scene information of the correction target image.

On the other hand, if there is history information including the same scene information as the scene information of the correction target image (step S501: Yes), then at step S503 the web server 101 determines whether a stored target color included in the history information is different from the used target color. Here, if the stored target color included in the history information is the same as the used target color (step S503: No), then the process ends there.

On the other hand, if the stored target color included in the history information is different from the used target color (step S503: Yes), then the web server 101 calculates, at step S504, an average value between the stored target color and the used target color, as a new stored target color. Specifically, when the stored target color is (Dest_R_p, Dest_G_p, Dest_B_p) and the used target color is (Dest_R_c, Dest_G_c, Dest_B_c), a new stored target color (Dest_R_new, Dest_G_new, Dest_B_new) is calculated by the following equation (6):

Dest_R_new=(Dest_R_p+Dest_R_c)/2

Dest_G_new=(Dest_G_p+Dest_G_c)/2

Dest_B_new=(Dest_B_p+Dest_B_c)/2  (6)

Note that although in the above-described example a new stored target color is calculated by simply averaging the stored target color and the used target color, a new stored target color may be calculated by, for example, weighted averaging where weighting is performed such that the weight of the used target color is higher than that of the stored target color.

Finally, at step S505, the web server 101 updates the stored target color in the history information including the same scene information as the scene information of the correction target image, with the new stored target color calculated at step S504, and ends the series of processes illustrated in FIG. 15.

As described above, in the image processing system of the present embodiment, an average value between a used target color used when correcting a correction target image and a stored target color included in history information is calculated as a new stored target color, and the stored target color included in the history information is updated with the calculated new stored target color. Therefore, compared to the case in which a target color used in one correction process is stored as a stored target color as it is, a stored target color in which past history is reflected more can be held as history information while being updated whenever necessary. Thus, when the stored target color is used in a later correction process, a more appropriate correction process can be performed.

Fourth Embodiment

Next, an image processing system of a fourth embodiment will be described. In the present embodiment, when an image correcting unit 106 corrects a correction target image based on a target color, the image correcting unit 106 determines the amount of color correction to a predetermined region of the correction target image, according to the difference between a representative color of the predetermined region (e.g., a face region) of the correction target image and the target color. Other processes and the configuration of the image processing system are the same as those of the first embodiment, and thus, only a characteristic process performed by the image correcting unit 106 in the present embodiment will be described below.

As in the first embodiment, the image correcting unit 106 includes a region detecting unit 121, a representative color calculating unit 122, a brightness correcting unit 123, and a color correcting unit 124 (see FIG. 10). Processes performed by the region detecting unit 121, the representative color calculating unit 122, and the brightness correcting unit 123 are the same as those of the first embodiment. As in the first embodiment, the color correcting unit 124 performs, for example, a color correction process on a face region of a correction target image, using linear masking. Note, however, that the color correcting unit 124 of the present embodiment changes the amount of color shade correction to the face region, according to the difference between a representative color of the face region calculated by the representative color calculating unit 122 and a target color, instead of allowing the representative color of the face region calculated by the representative color calculating unit 122 to match the target color.

Specifically, the color correcting unit 124 of the present embodiment sets coefficients for making a color correction such that a representative color (Face_R', Face_G', Face_B') gets closer to the shade of a target color (Dest_R, Dest_G, Dest_B), according to the difference between the representative color (Face_R', Face_G', Face_B') of a face region of a correction target image having been subjected to a brightness correction, and the target color (Dest_R, Dest_G, Dest_B).

Figure 16:
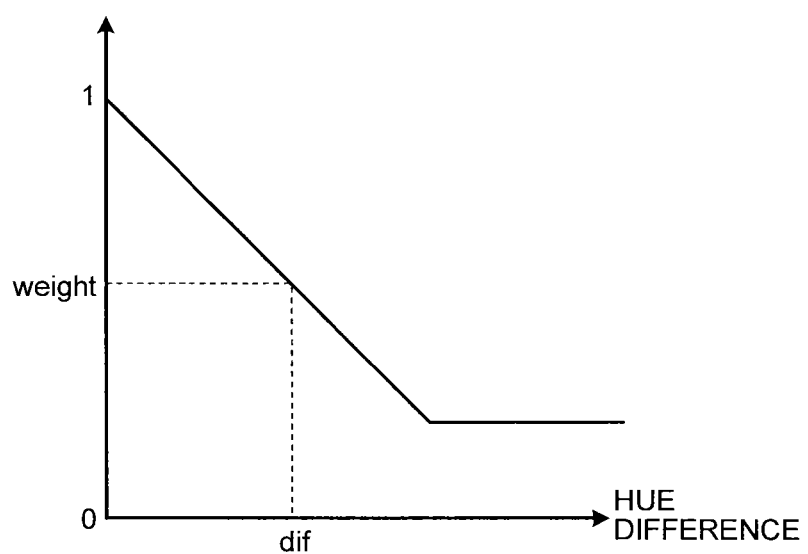
FIG. 16 is a graph diagram illustrating a relationship between a hue difference between a representative color of a face region and a target color, and a weight coefficient to be set.

FIG. 16 is a graph diagram illustrating a relationship between a hue difference value (hue difference) between a representative color (Face_R', Face_G', Face_B') of a face region and a target color (Dest_R, Dest_G, Dest_B), and a weight coefficient to be set. When the LCH converted value of the representative color (Face_R', Face_G', Face_B') of the face region after a brightness correction is (Face_L', Face_C', Face_H') and the LCH converted value of the RGB value (Dest_R, Dest_G, Dest_B) of the target color is (Dest_L, Dest_C, Dest_H), a hue difference value dif is calculated by the following equation (7):

dif=|Face_H'−Dest_H|  (7)

The color correcting unit 124 of the present embodiment determines a weight according to the hue difference value dif, from the hue difference value dif determined by the above-described equation (7) and the graph diagram of FIG. 16. The graph diagram of FIG. 16 illustrates that the larger the hue difference dif, the smaller the weight, i.e., the smaller the degree at which the representative color of the face region is brought closer to the shade of the target color; and the smaller the hue difference dif, the larger the degree at which the representative color of the face region is brought closer to the shade of the target color.

After determining the weight in the above-described manner, the color correcting unit 124 of the present embodiment determines a hue value Dest_H' of the target color according to the following equation (8), using the LCH converted value (Face_L', Face_C', Face_H') of the representative color of the face region and the LCH converted value (Dest_L, Dest_C, Dest_H) of the target color.

$$Dest\_L' = Dest\_L$$

$$Dest\_C' = Dest\_C$$

$$Dest\_H' = (1-\text{weight}) \times Face\_H' + \text{weight} \times Dest\_H \quad (8)$$

Note that although in the present embodiment only the hue value Dest_H of the target color is changed according to the difference between the representative color of the face region and the target color, the chroma Dest_C of the target color may be further changed according to the difference between the representative color of the face region and the target color.

Thereafter, using, as a target color, (Dest_R', Dest_G', Dest_B') which is obtained by performing RGB conversion again on the LCH converted value (Dest_L', Dest_C', Dest_H') of the changed target color such as that described above, the color correcting unit 124 of the present embodiment sets coefficients for a color correction such that the representative color (Face_R', Face_G', Face_B') of the face region of the correction target image has the shade of the target color (Dest_R', Dest_G', Dest_B'). Subsequent processes are the same as those of the first embodiment, except that the target color (Dest_R, Dest_G, Dest_B) is replaced by (Dest_R', Dest_G', Dest_B').

As described above, in the image processing system of the present embodiment, according to the difference between a representative color of a face region of a correction target image and a target color, the degree at which the correction target image is brought closer to the target color decreases as the difference increases, and the correction target image is further brought closer to the target color as the difference decreases. Therefore, according to the image processing system of the present embodiment, while effectively suppressing an extreme color shade correction from being made to a correction target image, a correction process suitable for the characteristics of a user requesting a correction can be easily performed.

Although specific embodiments of image processing systems to which the present invention is applied are described above, the main functions (an acquiring unit, an extracting unit, a setting unit, and a correcting unit) of a web server 101, a similar image extracting unit 104, a target color setting unit 105, and an image correcting unit 106 which are described in the above-described embodiments can also be implemented by executing a program according to the present invention by a computer having a common hardware configuration. In this case, the computer that executes the program includes, for example, a control device such as a CPU, storage devices such as a ROM and a RAM, external storage devices such as an HDD and a CD drive device, a display device such as a display, and input devices such as a keyboard and a mouse.

The program executed by the computer is provided by, for example, being recorded in a computer-readable recording medium such as a CD-ROM, a flexible disk (FD), a CD-R, or a DVD (Digital Versatile Disc) in the form of files in an installable format or executable format.

In addition, the configuration may be such that the program executed by the computer is stored on another computer connected to a network such as the Internet, and is provided by being downloaded from this another computer via the network. In addition, the configuration may be such that the program executed by the computer is provided or distributed via a network such as the Internet. Furthermore, the configuration may be such that the program executed by the computer is provided by being installed in advance in a ROM or the like.

The above-described program has a module configuration including the functions of the aforementioned acquiring unit, extracting unit, setting unit, and correcting unit. For the actual hardware, by a CPU (processor) reading a program from the recording medium and executing the program, the above-described functions are loaded onto a main storage device, by which an acquiring unit, an extracting unit, a setting unit, and a correcting unit are created on the main storage device.

According to the present invention, user information indicating characteristics of a user requesting a correction is acquired, an image that matches the characteristics of the user is extracted from the image accumulating unit based on the user information, and a correction target value is set based on the extracted image to correct a correction target image. Thus, an advantageous effect is provided that a correction process suitable for the characteristics of the user requesting a correction can be easily performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an acquiring unit configured to acquire a correction target image and user information indicating characteristics of a user requesting a correction;
   an image accumulating unit configured to accumulate images therein;
   an extracting unit configured to extract an image from the image accumulating unit based on the user information acquired by the acquiring unit, the image matching the characteristics of the user requesting the correction;
   a setting unit configured to set a correction target value based on the image extracted by the extracting unit;
   a correcting unit configured to correct the correction target image based on the correction target value, wherein:
   the image accumulating unit accumulates a corrected image and user information indicating characteristics of the user requesting a correction of the image such that the image and the user information are associated with each other;
   the extracting unit extracts the image associated with the user information similar to the user information acquired by the acquiring unit from the image accumulating unit;
   the image accumulated in the image accumulating unit is further associated with scene information indicating a subject type and a shooting condition of the image;
   the acquiring unit further acquires the scene information indicating the subject type and the shooting condition of the correction target image; and
   the extracting unit extracts from the image accumulating unit an image associated with user information similar to the user information acquired by the acquiring unit and associated with scene information matching the scene information acquired by the acquiring unit; and a registering unit configured to register history information in a storage unit such that the history information is associated with the user information of the user requesting the correction, the history information including the scene information of the correction target image and the correction target value, wherein the setting unit sets the correction target value included in the history information when the history information registered to be associated with the user information acquired by the acquiring unit has history information including scene information matching the scene information acquired by the acquiring unit.

2. The image processing apparatus according to claim 1, wherein the extracting unit extracts from the image accumulating unit an image which matches the characteristics of the user requesting the correction, and whose similarity to the correction target image is greater than or equal to a predetermined reference value.

3. The image processing apparatus according to claim 1, wherein the extracting unit extracts a plurality of images from the image accumulating unit, the image processing apparatus further comprises a first image presenting unit configured to present the user with the plurality of images extracted by the extracting unit, and accept a user operation selecting one of the plurality of presented images, and the setting unit sets the correction target value based on the image selected by the user from among the plurality of images extracted by the extracting unit.

4. The image processing apparatus according to claim 1, wherein the user information includes at least one of a nationality of the user and an age of the user.

5. The image processing apparatus according to claim 1, further comprising a second image presenting unit configured to present the user with the correction target image which is corrected based on the correction target value included in the history information, and accept a user operation specifying whether another correction is required, wherein when the second image presenting unit accepts an operation indicating that the other correction is required, the setting unit sets a new correction target value based on the image extracted by the extracting unit, and when the setting unit sets the new correction target value, the registering unit updates the correction target value included in the history information based on the new correction target value.

6. The image processing apparatus according to claim 1, wherein the correction target value is a target color indicating a targeted color, and the correcting unit makes a correction to bring a color of a predetermined region included in the correction target image closer to the target color.

7. The image processing apparatus according to claim 6, wherein the correction unit makes a correction such that the color of the predetermined region gets closer to the target value as a difference between the color of the predetermined region and the target color decreases.

8. An image processing method performed by an image processing apparatus, the method comprising:

acquiring, by an acquiring unit of the image processing apparatus, a correction target image and user information indicating characteristics of a user requesting a correction;

accumulating, by an accumulating unit of the image processing apparatus, images;

extracting, by an extracting unit of the image processing apparatus, an image from the image accumulating unit based on the user information acquired by the acquiring unit, the image matching the characteristics of the user requesting the correction;

setting, by a setting unit of the image processing apparatus, a correction target value based on the image extracted by the extracting unit;

correcting, by a correcting unit of the image processing apparatus, the correction target image based on the correction target value;

accumulating, by the image accumulating unit of the image processing apparatus, a corrected image and user information indicating characteristics of the user requesting a correction of the image such that the image and the user information are associated with each other;

extracting, by the extracting unit of the image processing apparatus, the image associated with the user information similar to the user information acquired by the acquiring unit from the image accumulating unit;

associating the image accumulated in the image accumulating unit with scene information indicating a subject type and a shooting condition of the image;

acquiring, by the acquiring unit of the image processing apparatus, the scene information indicating the subject type and the shooting condition of the correction target image;

extracting, by the extracting unit of the image processing apparatus, from the image accumulating unit an image associated with user information similar to the user information acquired by the acquiring unit and associated with scene information matching the scene information acquired by the acquiring unit;

registering, by a registering unit of the image processing apparatus, register history information in a storage unit such that the history information is associated with the user information of the user requesting the correction, the history information including the scene information of the correction target image and the correction target value; and setting, by the setting unit of the image processing apparatus, the correction target value included in the history information when the history information registered to be associated with the user information acquired by the acquiring unit has history information including scene information matching the scene information acquired by the acquiring unit.

9. A non-transitory computer-readable recording medium that contains a computer program that causes a computer to execute the steps of:

acquiring a correction target image and user information indicating characteristics of a user requesting a correction;

accumulating images into an image accumulating unit;

extracting an image from the image accumulating unit based on the acquired user information, the image matching the characteristics of the user requesting the correction;

setting a correction target value based on the extracted image;

correcting the correction target image based on the correction target value;

accumulating a corrected image and user information indicating characteristics of the user requesting a correction of the image such that the image and the user information are associated with each other;

extracting the image associated with the user information similar to the acquired user information;

associating the image accumulated in the image accumulating unit with scene information indicating a subject type and a shooting condition of the image;

acquiring the scene information indicating the subject type and the shooting condition of the correction target image;

extracting from the image accumulating unit an image associated with user information similar to the acquired user information and associated with scene information matching the acquired scene information;

registering register history information in a storage unit such that the history information is associated with the user information of the user requesting the correction, the history information including the scene information of the correction target image and the correction target value; and setting the correction target value included in the history information when the history information registered to be associated with the acquired user information has history information including scene information matching the acquired scene information.

\* \* \* \* \*